US012163372B2

(12) United States Patent
Bernhagen et al.

(10) Patent No.: US 12,163,372 B2
(45) Date of Patent: Dec. 10, 2024

(54) ENHANCED FIELD OF VIEW FOR FENESTRATION UNITS

(71) Applicant: Pella Corporation, Pella, IA (US)

(72) Inventors: Todd A. Bernhagen, Pella, IA (US); Paul D. Schroder, Pella, IA (US); Evan R. Vande Haar, Pella, IA (US)

(73) Assignee: Pella Corporation

( * ) Notice: Subject to any disclaimer, the term of this patent is extended or adjusted under 35 U.S.C. 154(b) by 0 days.

(21) Appl. No.: 17/233,731

(22) Filed: Apr. 19, 2021

(65) Prior Publication Data

US 2021/0340808 A1 Nov. 4, 2021

Related U.S. Application Data

(63) Continuation of application No. 16/448,140, filed on Jun. 21, 2019, now Pat. No. 10,982,484.

(60) Provisional application No. 62/688,480, filed on Jun. 22, 2018.

(51) Int. Cl.

| | |
|---|---|
| ***E06B 3/64*** | (2006.01) |
| ***E06B 3/54*** | (2006.01) |
| ***E06B 3/663*** | (2006.01) |
| ***E06B 7/28*** | (2006.01) |

(52) U.S. Cl.

CPC .............. *E06B 3/64* (2013.01); *E06B 3/5454* (2013.01); *E06B 3/66309* (2013.01); *E06B 7/28* (2013.01)

(58) Field of Classification Search

CPC ...... E06B 3/64; E06B 3/5454; E06B 3/66309; E06B 7/28

See application file for complete search history.

(56) References Cited

U.S. PATENT DOCUMENTS

| | | | | |
|---|---|---|---|---|
| 5,653,073 | A * | 8/1997 | Palmer | E06B 3/64 52/204.593 |
| 6,177,156 | B1 | 1/2001 | Glover et al. | |
| 6,286,288 | B1 | 9/2001 | France | |
| 6,463,706 | B1 | 10/2002 | Guhl et al. | |
| 6,868,648 | B2 | 3/2005 | Glover et al. | |
| 7,836,643 | B2 | 11/2010 | Walch | |
| 8,720,135 | B2 | 5/2014 | Snderkr et al. | |
| 8,943,769 | B2 | 2/2015 | Snderkr et al. | |

(Continued)

FOREIGN PATENT DOCUMENTS

| | | | |
|---|---|---|---|
| CA | 2260070 | A1 | 1/1998 |
| DE | 10059849 | A1 | 5/2001 |

(Continued)

OTHER PUBLICATIONS

English Translation of 2005/028793.*

(Continued)

*Primary Examiner* — Andrew J Triggs

(74) *Attorney, Agent, or Firm* — FAEGRE DRINKER BIDDLE & REATH

(57) ABSTRACT

A fenestration unit comprising a frame having a center, a sash coupled to the frame, an interior pane coupled to the sash, a spacer coupled to the interior pane, an exterior pane coupled to the sash and the spacer, the exterior pane including an inward-facing surface, and a peripheral shield disposed on the inward-facing surface of the exterior pane such that, when viewed at direct angle, the peripheral shield hides the spacer, the sash, and at least part of the frame.

20 Claims, 8 Drawing Sheets

(56) References Cited

U.S. PATENT DOCUMENTS

| | | | | |
|---|---|---|---|---|
| 9,016,009 | B2 | 4/2015 | Snderkr et al. | |
| 9,016,010 | B2 | 4/2015 | Snderkr et al. | |
| 10,267,086 | B2 * | 4/2019 | Vander Bent | E06B 5/103 |
| 2003/0126812 | A1 * | 7/2003 | Folsom | E06B 1/345 52/204.61 |
| 2008/0256896 | A1 | 10/2008 | Lisec | |
| 2009/0229216 | A1 * | 9/2009 | Duncan | E06B 5/10 52/204.6 |
| 2010/0199591 | A1 | 8/2010 | Soenderkaer et al. | |
| 2010/0205879 | A1 | 8/2010 | Soenderkaer et al. | |
| 2010/0205881 | A1 | 8/2010 | Soenderkaer et al. | |
| 2014/0305053 | A1 | 10/2014 | Snderkr et al. | |
| 2014/0305054 | A1 | 10/2014 | Snderkr et al. | |
| 2016/0108658 | A1 | 4/2016 | Cruysberghs | |
| 2016/0290031 | A1 | 10/2016 | Stazi et al. | |
| 2019/0390507 | A1 * | 12/2019 | Bernhagen | E06B 3/64 |

FOREIGN PATENT DOCUMENTS

| | | | | |
|---|---|---|---|---|
| EP | 1908910 | A2 | 4/2008 | |
| EP | 2039867 | A2 | 3/2009 | |
| EP | 2105567 | A1 * | 9/2009 | E05B 3/00 |
| EP | 2295697 | A2 | 3/2011 | |
| EP | 2816187 | A2 | 12/2014 | |
| FR | 2708030 | A1 | 1/1995 | |
| WO | 99/14169 | A1 | 3/1999 | |
| WO | WO-2005028793 | A1 * | 3/2005 | E05B 17/0025 |

OTHER PUBLICATIONS

Internorm, "Windows Highlights of Architecture," Kastrup from Internorm product brochure, 16 pages, available at least as early as Aug. 2017.

* cited by examiner

ENHANCED FIELD OF VIEW FOR FENESTRATION UNITS

CROSS-REFERENCE TO RELATED APPLICATION

This application is a Continuation of U.S. application Ser. No. 16/448,140, filed Jun. 21, 2019 and entitled "Enhanced Field of View for Fenestration Units," which claims priority to Provisional Application No. 62/688,480, filed Jun. 22, 2018, which is herein incorporated by reference in its entirety.

TECHNICAL FIELD

Various aspects of the instant disclosure relate to fenestration products, such as windows. In some specific examples, the disclosure concerns expanded view windows.

BACKGROUND

In various architectural elements and fenestration units, such as windows and doors, it may be more aesthetically desirable to have larger viewing areas that are unobstructed by the opaque members of the fenestration units. For example, it may be desirable to maximize the viewable size of the transparent pane and minimize the viewable size of the opaque frame.

SUMMARY

Various aspects of the disclosure relate to expanded view fenestration units, such as expanded view windows having continuous appearance from the frame to the exterior pane when viewed from the interior. An exemplary fenestration unit comprises a frame, a sash, an exterior pane, an interior pane. In some examples, the unit includes a spacer and/or a peripheral shield. The frame has a plurality of frame members and a center. The sash is coupled to the frame and includes a first support surface and a second support surface, both being outward-facing, or exterior-facing. The first support surface is positioned farther away from the center of the frame than the second support surface in a radial direction (i.e., in a direction of the width and/or height of the frame). The exterior pane is coupled to the first support surface of the sash, and the exterior pane includes an inward-facing side and a first edge (e.g., a side edge) having a first length. The interior pane is coupled to the second support surface of the sash and includes a first edge (e.g., a side edge) having a second length that is shorter than the first length of the exterior pane. For example, the interior pane may be narrower and/or shorter than the exterior pane such that the edges of the exterior pane extend radially outward beyond the edges of the interior pane in an assembled unit.

Where present, the spacer generally has an inward-facing surface (or interior-facing surface) and an outward-facing surface (or exterior-facing surface), and is coupled between the interior and exterior panes. Where present, the peripheral shield is disposed on the inward-facing side of the exterior pane and coupled to the sash such that the sash and the spacer are shielded from observation by the peripheral shield when viewed at direct angle from the exterior.

Though described in terms of a window unit (e.g., using terminology such as "sash"), it should be readily understood that similar concepts may be applied to doors as well.

While multiple inventive examples are specifically disclosed, various modifications and combinations of features from those examples will become apparent to those skilled in the art from the following detailed description. Accordingly, the disclosed examples are meant to be regarded as illustrative in nature and not restrictive.

Figure 1:
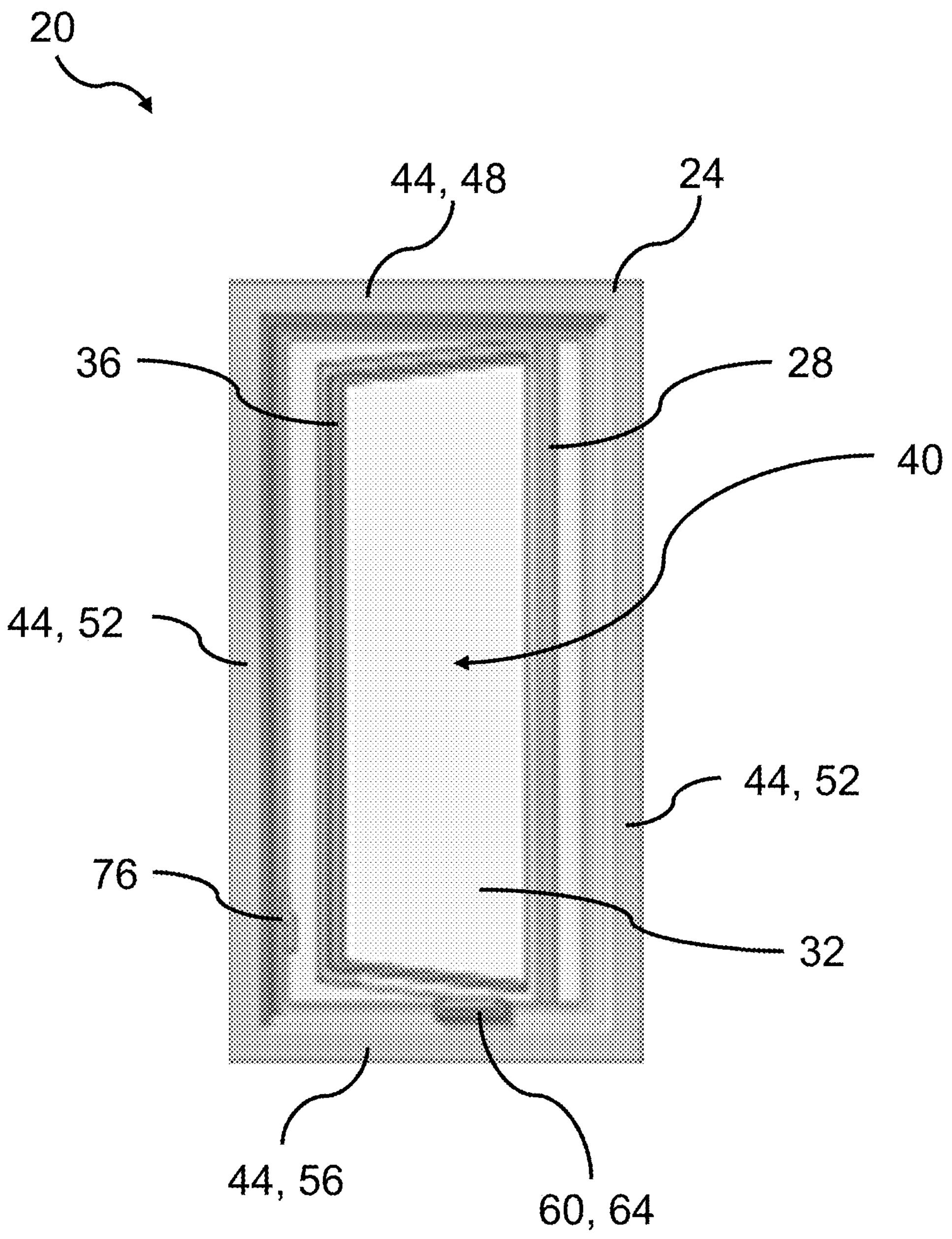
FIG. 1 shows an expanded view fenestration unit, viewing from the interior, according to some examples.

While the disclosure is amenable to various modifications and alternative forms, specific embodiments have been shown by way of example in the drawings and are described in detail below. The disclosure, however, is not limited to the particular embodiments described. On the contrary, the disclosure is intended to cover all modifications, equivalents, and alternatives falling within the scope of the disclosure as defined by the appended claims.

DETAILED DESCRIPTION

Expanded view fenestration units according to the inventive examples may be adapted for a variety of window and/or door styles (collectively referred to as "fenestration units") including sliding, hinged, fixed, casement, awning, projected, and others. An expanded view fenestration unit helps enhance or otherwise increase the viewing area of a fenestration unit by decreasing the impact of intermediate and/or exterior visual elements of the fenestration unit. Generally, the principles of the instant disclosure are applicable to fenestration units including multiple panes of clear glazing to enhance the viewable area experienced when looking out through such glazing from an interior of a structure in which a unit is installed. In different terms, the impact of the thickness of the fenestration unit is decreased by decreasing the impact of the intermediate and exterior components on the exterior viewable area as viewed from the interior of the fenestration unit.

FIG. 1 shows an expanded view fenestration unit 20 including a frame 24, a sash 28, an exterior pane 32, and an interior pane 36, viewing from the interior, according to some examples. The fenestration unit 20 may define a boundary between an interior space and an exterior space, where the region exterior to the exterior pane 32 of the fenestration unit 20 is the exterior space, and the region interior to the interior pane 36 is the interior space. For clarity and brevity, a member of the fenestration unit located closer to the exterior space than to the interior space may be described as located outwardly. In contrast, a member may be described as located inwardly when located closer to the interior space than to the exterior space. The frame 24 of the fenestration unit 20 has a center 40 and includes a plurality of frame members 44, such as a head 48, jambs 52, and a sill 56.

In various embodiments, the sash 28 may be coupled to the frame 24 and configured to vent or open as in sliding, casement, awning, projected, or hopper doors or windows. Alternatively, the sash 28 may be coupled to the frame 24 fixedly (e.g. rigidly with mechanical connectors and/or adhesives) as in fixed or picture windows, for example. The sash 28 may comprise pultruded fiberglass or other material with appropriate durability and mechanical strength. The exterior pane 32 is coupled to the sash 28 outwardly of the interior pane 36, or in alternative terms, the interior pane 36 is coupled to the sash 28 inwardly (see FIG. 3 for a side view) of the exterior pane 32. Although the illustrated example is a casement window configured to transition between a closed state and an opened state (as in FIG. 1), it should be understood that the features described are equally applicable to fixed, awning, projected, and hopper windows, with the appropriate modifications deemed appropriate to a person having ordinary skill in the art applied. Similarly, and as referenced, the features described may further be applicable to other fenestration units such as doors. As indicated in FIG. 1, the frame 24 of the fenestration unit 20 may further comprise an operating member 60, such as a lever 64, configured to operate a vent mechanism 68, such as a hinge assembly 72 (see FIG. 3), to transition the fenestration unit 20 between the closed and open states. The frame 24 of the fenestration unit 20 may further comprise a locking member 76, configured to activate and deactivate a lock mechanism (not shown) to lock and unlock, respectively, the sash 28.

Figure 2:
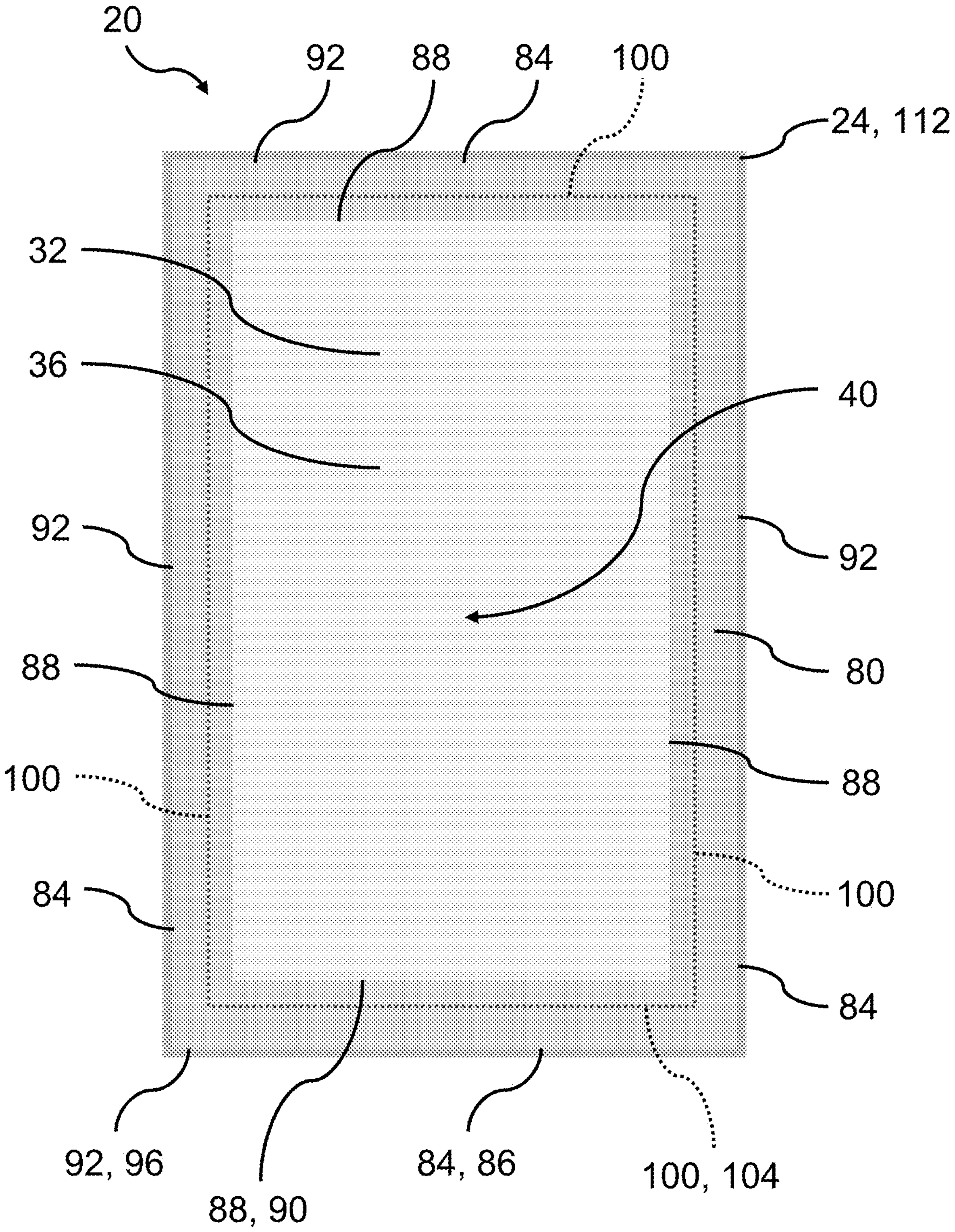
FIG. 2 shows the expanded view fenestration unit of FIG. 1, viewing from the exterior, according to some examples.

FIG. 2 shows the expanded view fenestration unit 20 of FIG. 1, from an exterior perspective, according to some examples. As illustrated, the fenestration unit 20 comprises a peripheral shield 80 disposed on the exterior pane 32 around the edges such that when viewed from the exterior, parts of the fenestration unit 20 positioned inwardly to the peripheral shield 80 are shielded from observation by the peripheral shield 80. For example, part of the frame 24, part of the interior 36, and a majority, or the totality of the sash 28 may be shielded from direct observation by the peripheral shield 80, as in FIG. 2. The peripheral shield 80 includes one or more outer edges 84 and one or more inner edges 88, where the amount of edges may depend on the shape of the fenestration unit 20 and/or the shape of the peripheral shield 80. As illustrated, the peripheral shield 80 includes a first outer edge 86 of the one or more outer edges 84 and a first inner edge 90 of the one or more inner edges 88. A first width may be defined by the distance between the first outer edge 86 and the first inner edge 90 of the peripheral shield 80. In various embodiments, the first width is smaller or equal to two inches to help maximize viewable area of the fenestration unit 20. The exterior pane 32 may have one or more edges 92 including a first edge 96. The first outer edge 90 of the peripheral shield 80 substantially overlaps with the first edge 96 of the exterior pane 32. Similarly, the remaining of the one or more outer edges 84 of the peripheral shield 80 may substantially overlap with the remaining of the one or more edges 92 of the exterior pane 32 to provide complete peripheral coverage of the peripheral shield 80 around the edges of the exterior pane 32.

In various embodiments, the interior pane 36 (see FIG. 1) may be substantially similar in shape to the exterior pane 32 (see FIG. 2) while being smaller in size. Therefore, each of the one or more edges 100 of the interior pane 36 is shorter than the corresponding edge of the one or more edges 92 of the exterior pane 32. For example, a first edge 104 of the interior pane 36 may be shorter than the first edge 96 of the exterior pane 32. The first edge 104 of the interior pane 36 may also be closer to the center 40 of the frame 24 than the first edge 96 of the exterior pane 32. As illustrated in FIG. 2, the one or more inner edges 88 of the peripheral shield 80 are closer to the center 40 of the frame than the one or more edges 104 of the interior pane 32. This may be designed such that a spacer 108 (hidden in FIG. 2, see FIG. 3 for side view) disposed between the exterior pane 32 and the interior pane 36 may be shielded from observation by the peripheral shield 80 when viewed from the exterior.

As illustrated in FIG. 2, the peripheral shield 80 may shield part of the frame 24 from observation to help provide an expanded view and/or a visually-frameless appearance when viewed from the exterior. The visually-frameless appearance represents a frontal (i.e., from the exterior) view having a high percentage (e.g., more than 80 percent, more than 90 percent, more than 95 percent, or more than 99 percent) of the observable area of the fenestration unit 20 being the exterior pane 32, (opposed to the frame 24 or sash 28 or other elements of the fenestration unit). To further help achieve the visually-frameless appearance, the peripheral shield 80 may be configured to have substantially the same appearance as of the frontal or exterior surface 112 of the frame 24. For example, the peripheral shield 80 and the exterior surface 112 of the frame 24 may be visually-opaque (e.g. to the naked eye), and at least one of the same color (e.g., non-reflective, dark-colored, such as black), and the same finish (e.g., matte-finished). Alternatively or additionally, the peripheral shield 80 may be at least one of reflective, light-colored (e.g. white or off-white), and glossy-finished. Having substantially similar appearance provides a continuous visual transition from the frame 24 to the exterior pane 32 to help achieve the visually-frameless appearance for the visually-frameless fenestration unit 20.

In some examples, the peripheral shield is formed of a ceramic enamel frit chosen to achieve the desired opacity, color, and other optical properties to match the appearance of the peripheral shield 80 to the exterior surface 112 of the frame 24. The peripheral shield 80 may also comprise a gradient in thickness and/or appearance between the one or more outer edges 84 and the one or more inner edges 88 of the peripheral shield 80. For example, the peripheral shield 80 may be more transparent near the first inner edge 90 such that the transition from the peripheral shield 80 to the non-shielded parts (i.e. parts near the center of the frame) of the transparent panes 32, 36 is less abrupt.

Figure 3:
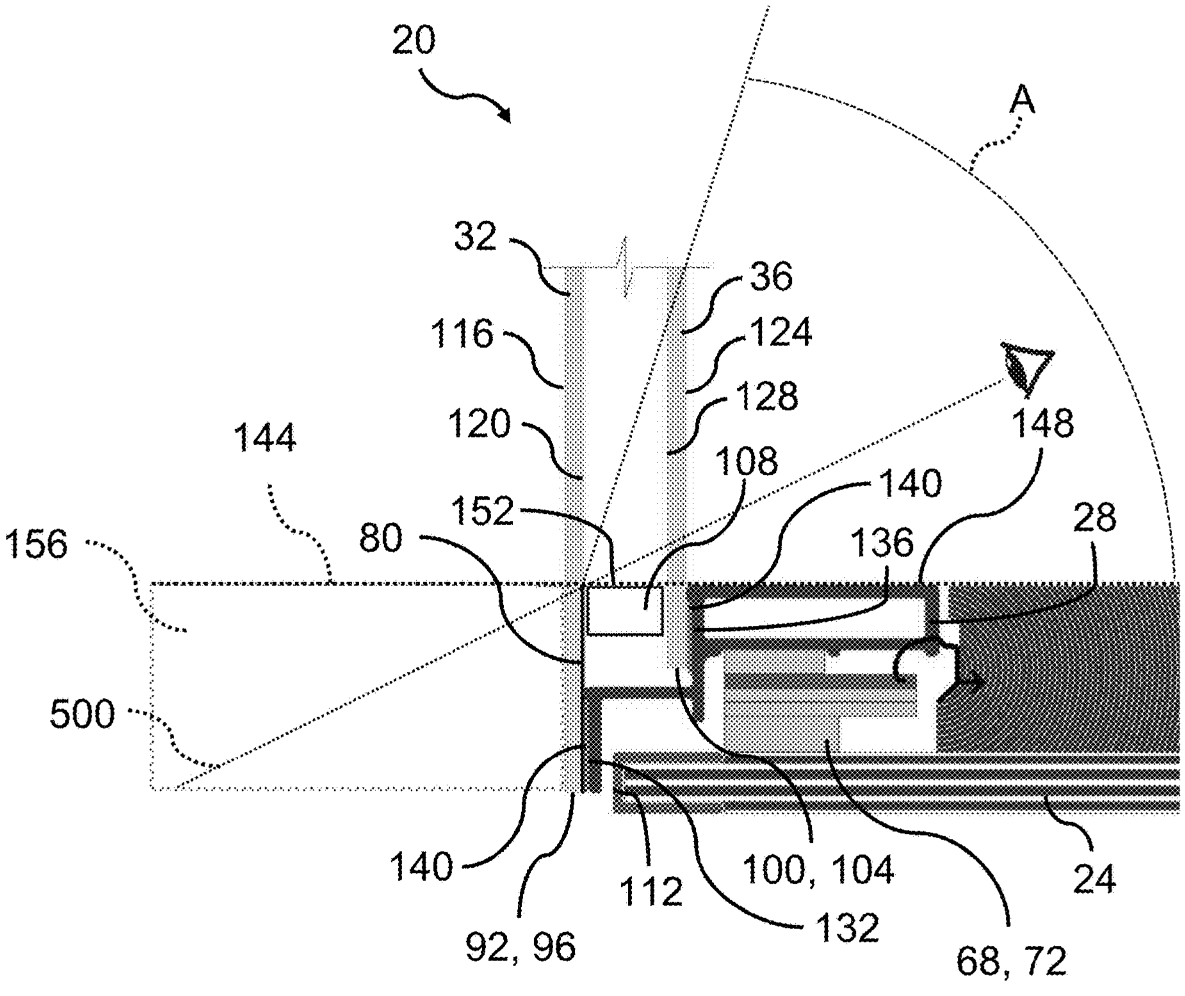
FIG. 3 shows the expanded view fenestration unit of FIG. 2, according to some examples.

FIG. 3 is a side view of the expanded view fenestration unit 20 of FIG. 2, according to some examples. For ease of visualization, the first edge 86, 90, 96, 104 are illustrated. The exterior pane 32 includes an outward-facing surface 116 and an inward-facing surface 120. The peripheral shield 80 may be disposed on the inward-facing surface 120 of the exterior pane 32 such that the peripheral shield 80 is protected from being damaged as well as to provide a continuous edge-to-edge surface (i.e. outward-facing surface 116) for the fenestration unit 20. As illustrated, the interior pane 36 includes an outward-facing surface 124 and an inward-facing surface 128. The spacer 108 disposed between the exterior pane 32 and the interior pane 36 is coupled to the outward-facing surface 124 of the interior pane 36 and to the peripheral shield 80 on the inward-facing surface 120 of the exterior pane 32.

The exterior surface 112 of the frame 24 is arranged more inwardly or less outwardly than the exterior pane 32 such that the exterior pane 32 is the most outwardly positioned member of the fenestration unit 20, or is nearly the most outwardly positioned member of the fenestration unit 20 with a very small portion of the frame (e.g., less than 0.25 inch projection) beyond the exterior pane 32. Regardless, in some examples, the most outwardly-positioned surface of the fenestration unit 20 may be the outward-facing surface 116 of the exterior pane 32. In at least this manner, an individual in the interior space looking outward through the interior and exterior panes 32, 36, respectively, is unable to see any portion of the frame 24 external to the exterior pane 36.

At least part of the exterior surface 112 of the frame 24 may be shielded from observation by the peripheral shield 80 when viewed at direct angle. This is to help achieve the expanded view appearance from the exterior space as described previously. The sash 28 includes a first support surface 132 configured to couple with the exterior pane 32 and a second support surface 136 configured to couple with the interior pane 36. Both the first and second support surfaces 132, 136 of the sash may be outward-facing to couple with the inward-facing surfaces 120, 128 of the exterior and interior panes 32, 36, respectively. The first support surface 132 of the sash may be arranged farther from the center 40 (see FIG. 2) of the frame 24 than the second support surface 136 to accommodate the larger size of the exterior pane 32 compared to the interior pane 36. As illustrated, the sash 28 is coupled to the frame 24 and optionally to the hinge assembly 72 such that the fenestration unit 20 may be transitioned between the closed and open states. The hinge assembly 72 may be any type of vent mechanism 68 known to a person having ordinary skill in the art. In some embodiments, such as a fixed window styled fenestration unit 20, the vent mechanism 68 may be absent.

The coupling between the sash 28 and the interior pane 36 and between the peripheral shield 80 and the sash 28 may be achieved by use of an adhesive 140, such as a urethane, silicone, or other glazing sealant, for example. The surface properties, such as roughness and exposed chemical bonds, of the peripheral shield 80 may be configured to form a strong adhesion with the adhesive 140. Alternatively or additionally, mechanical fasteners, such as clamps may be used. It is to be understood that any reasonable means for coupling fenestration components known to a person having ordinary skill in the art may be utilized.

As shown, when viewed from the exterior at a direct angle, the peripheral shield 80 shields the sash 28, the adhesive 140, the spacer 108, parts of the frame 24, and optionally the hinge assembly 72. Viewing at a direct angle refers to setting the eye level equal to or farther away from the center 40 of the frame than a reference plane 144. The reference plane 144 may be defined by one of the one or more inner edges 88 of the peripheral shield 80. For example, a center-facing surface 148 of the sash 28 and/or a center-facing surface 152 of the spacer 108 are the same distance or farther away from the center 40 of the frame 24 than the first inner edge 90 of the peripheral shield 80. Thus when the eye-level is set at the reference plane 144 that is an extension of the first inner edge 90 of the peripheral shield 80, the spacer 108 and the sash 28 near the first inner edge 90 are shielded from observation by the peripheral shield 80. Similar relationships may be found in the other one or more inner edges 88 of the peripheral shield 80.

In various embodiments, the exterior pane 32 is positioned more outwardly than the frame 24 such that the most outwardly positioned member of the fenestration unit 20 is the exterior pane 32. This provides an extra region 156 exterior to the external pane 32 which is unobstructed to viewing from both the interior and the exterior of the fenestration unit 20. The extra region 156 would be obstructed if the exterior pane 32 is less outwardly positioned than other members of the fenestration unit. Members commonly positioned more outwardly than the exterior pane in the field of fenestration include synthetic cladding, metallic cladding, and part of the sash. The unobstructed viewable extra region 156 may comprise the region directly exterior to the exterior pane and/or the peripheral shield.

In various embodiments, the fenestration unit 20 defines an obstruction-free viewing angle A starting from the reference plane 144 towards the center of the frame 40 (see FIG. 2), as shown in FIG. 3. When viewing from the interior space interior to the fenestration unit from a viewing angle (from eye level to reference plane 144) smaller or equal to the obstruction-free viewing angle A, the fenestration unit 20 may offer substantially or completely unobstructed view. For example, at least 80%, at least 90%, at least 95%, or 100% of the frame 24 may be hidden from being observed. Additionally, the building structure in which the fenestration unit 20 is secured to, may further be substantially or completely hidden from being observed, such as less than 20%, less than 10%, less than 5%, or 0% of the viewable area is obstructed by the building structure, when viewed from the interior of the fenestration unit 20. This feature is present due to the relative small, or no amount of frame extending exterior to the exterior pane 32. Similarly, by minimizing the amount of building structure (e.g., materials forming the rough opening) extending exterior to the exterior pane 32 the amount of building structure that is observable through the fenestration unit 20 can be minimized or potentially eliminated. This creates an enhanced viewing area for individuals on the interior side of the fenestration unit 20.

The enhanced or expanded view of fenestration unit 20 may be shown by a vision line 500 extending from a view point (represented by an eye in FIG. 3) in the interior space and extending to and beyond the inner edge of the peripheral shield. A user viewing from the view point may have unobstructed view between the vision line 500 and the center of the frame 40 (see FIG. 2). Whereas viewing away from the center of the frame 40 from the vision line 500 will result viewing to be blocked (e.g., by the peripheral shield 80 and/or the spacer 108 and/or the sash 28 and/or the frame 24).

Figure 4:
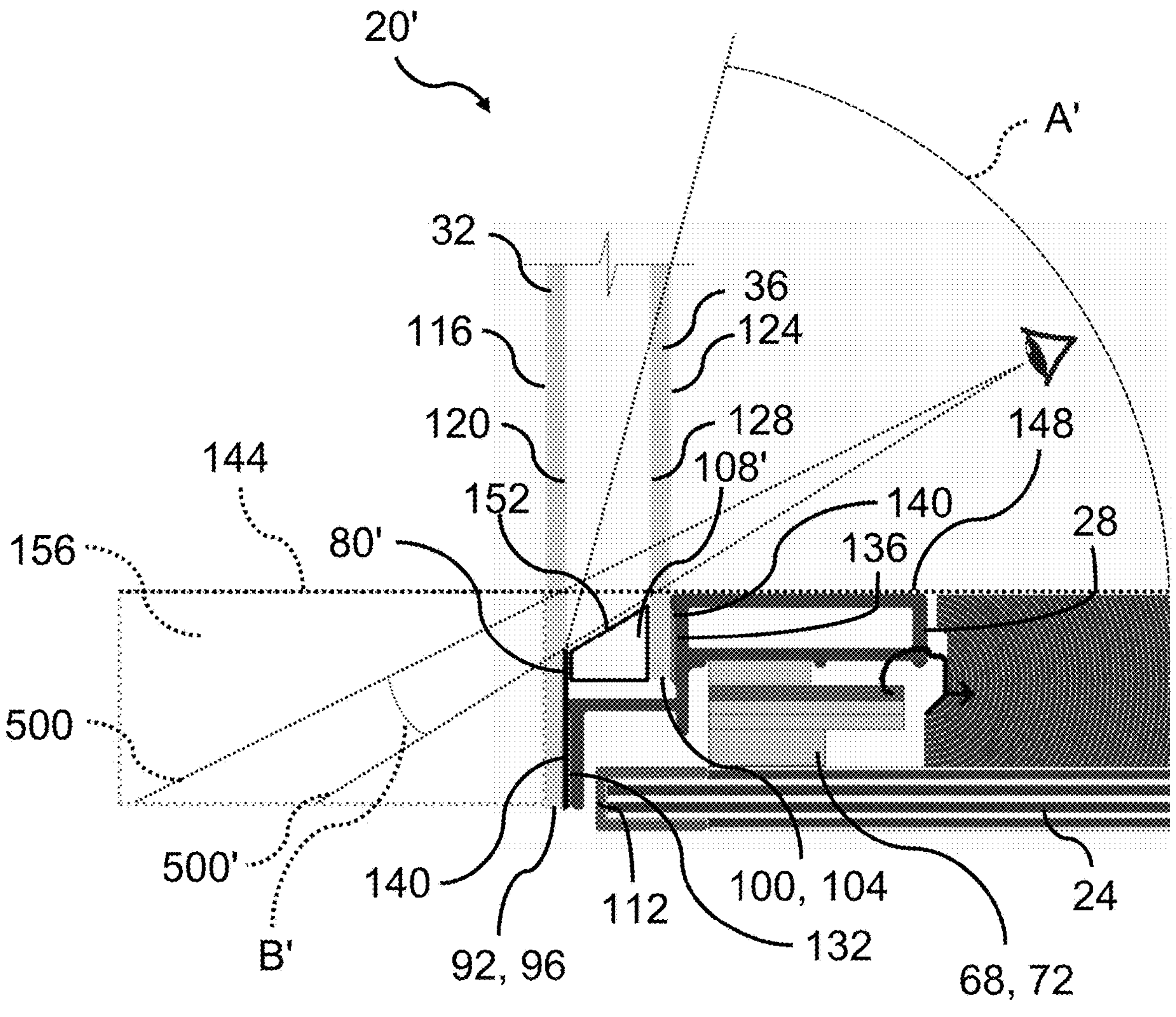
FIG. 4 shows the expanded view fenestration unit of FIG. 2, according to some examples.

FIG. 4 shows the expanded view fenestration unit 20' of FIG. 2, according to some examples. Fenestration unit 20' may be similar to fenestration unit 20 of FIG. 3 and may include one or more elements and/or features of fenestration unit 20. As shown, the spacer 108' of FIG. 4 is substantially trapezoidal instead of the substantially rectangular spacer 108 of FIG. 3. In turn, the peripheral shield 80' is smaller than the peripheral shield 80 due to the reduced contacting area between the shield and the spacer. The use of a trapezoidal spacer 108' results in a larger obstruction-free viewing angle A' when compared to obstruction-free viewing angle A, thus increasing the range of angle where substantially or completely unobstructed view may be observed from the interior space. As illustrated, the vision line 500' is more away from the center of the frame 40 (see FIG. 2) than the vision line 500 of FIG. 3 (i.e., differs by angle B'), effectively expanding or enhancing the viewing angle in which substantially unobstructed viewing may be observed from the interior space.

Figure 5:
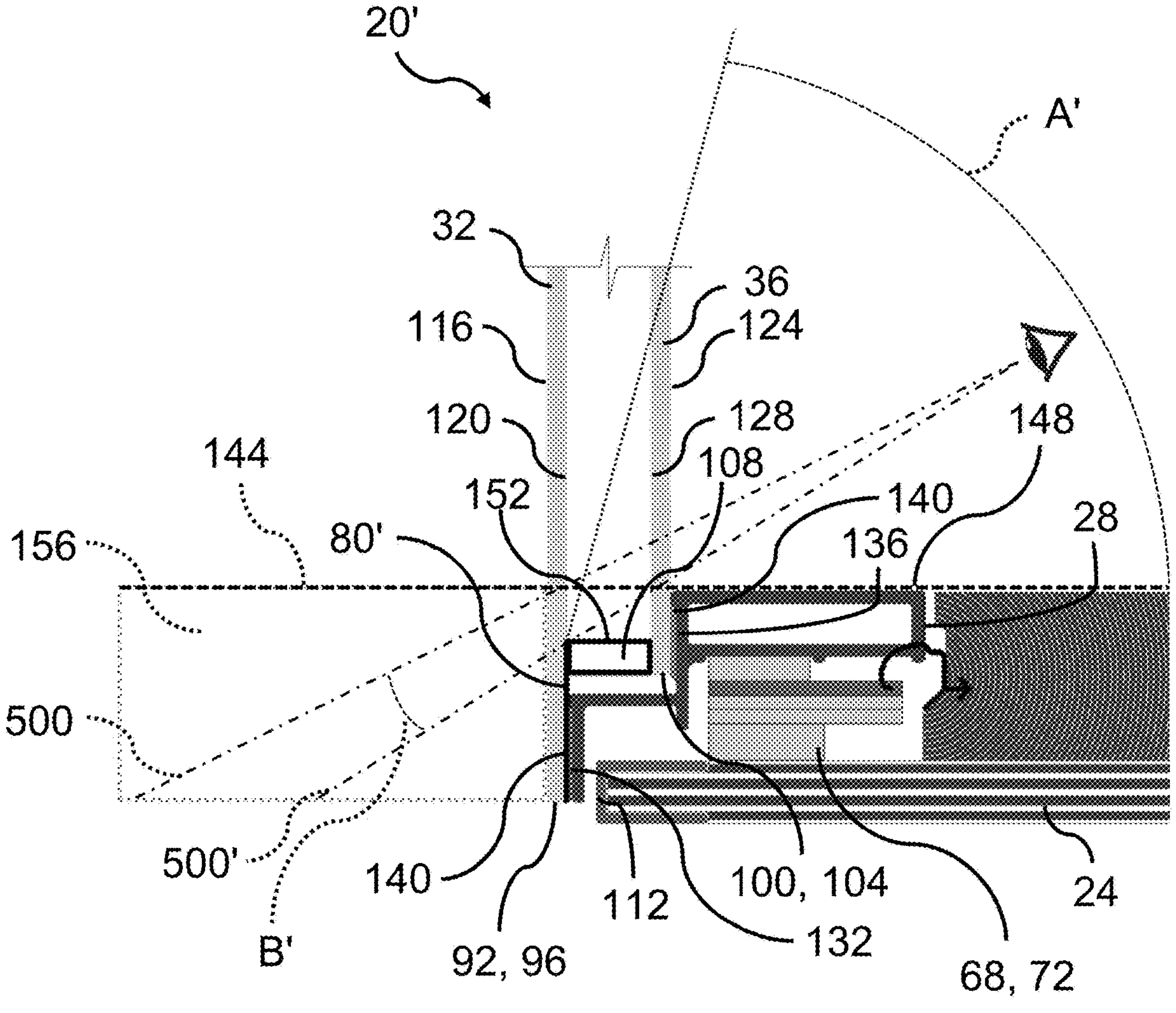
FIG. 5 shows the expanded view fenestration unit of FIG. 2, according to some examples.

FIG. 5 shows an alternative embodiment in which the substantially rectangular spacer 108 of FIG. 3 is positioned farther away from the center of the frame 40 (when compared to FIG. 3) to obtain vision line 500'. In the example of FIG. 5, the spacer is recessed, or moved more radially outward such that the spacer 108 is recessed relative to the second support surface 136 of the sash 28 and away from the vision line 500. Once again, the resultant vision line 500' is more away from the center of the frame 40 (see FIG. 2) than the vision line 500 of FIG. 3 (i.e., differs by angle B'), effectively expanding or enhancing the viewing angle in which substantially unobstructed viewing may be observed from the interior space.

Figure 6:
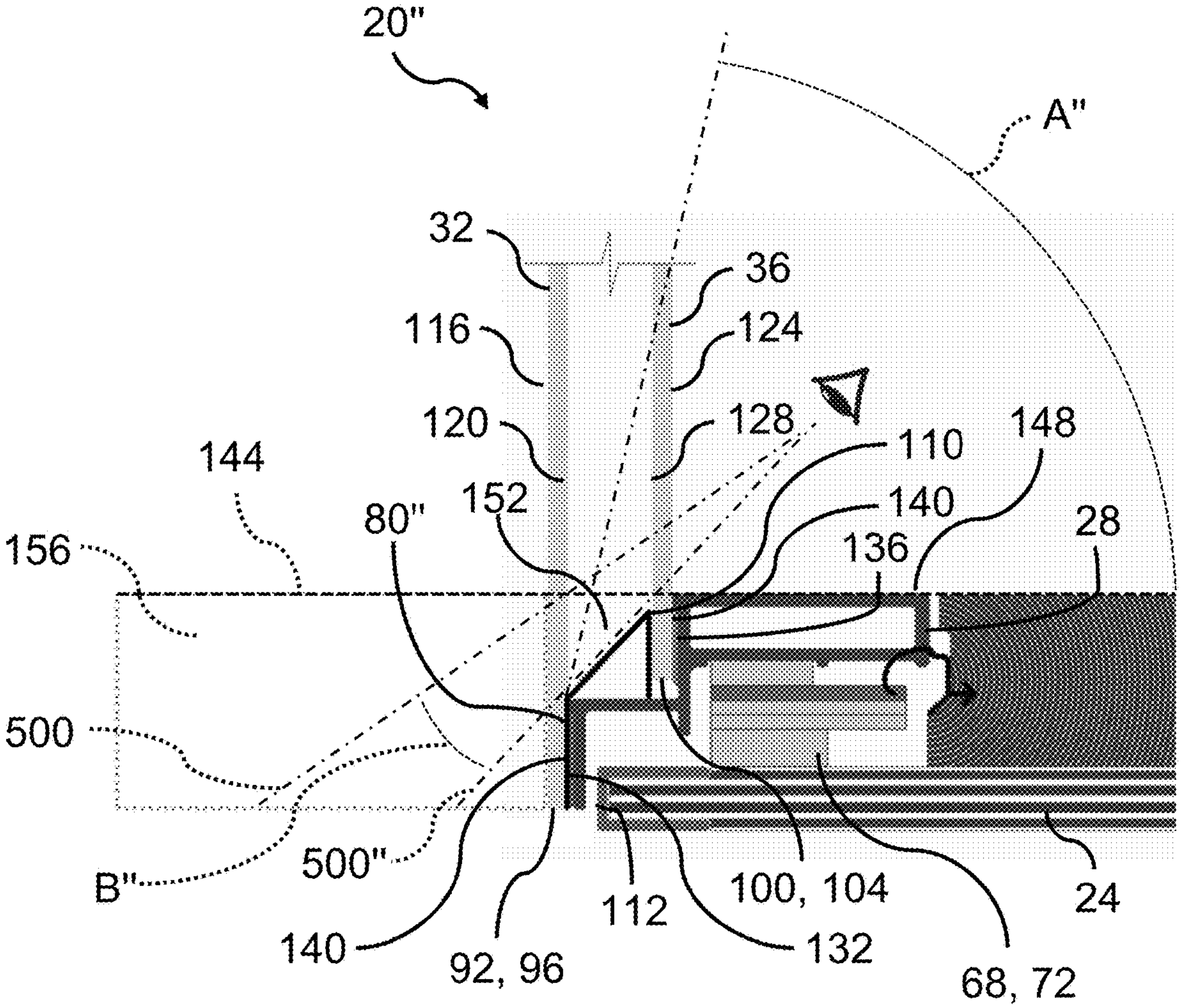
FIG. 6 shows the expanded view fenestration unit of FIG. 2, according to some examples.

FIG. 6 shows the expanded view fenestration unit 20" of FIG. 2, according to some examples. Fenestration unit 20" may be similar to fenestration unit 20 of FIG. 3 and/or fenestration unit 20' of FIG. 4 and may include one or more elements and/or features of fenestration unit 20 and/or fenestration unit 20'. As shown, in place of a spacer, fenestration unit 20" includes a cover 110, such as a triangular cover positioned against the interior pane 36 and/or the sash 28. The cover 110 may be configured to hide, shield, or conceal a glazing material used to bond the interior pane 36 to the sash 28. As illustrated, the use of the cover 110 may result in an even larger obstruction-free viewing angle A" when compared to A of FIG. 3 and A' of FIG. 4. Additionally, vision line 500" is also further away from the center of the frame 40 (see FIG. 2) than that of FIG. 3 (i.e., differs by angle B" from 500) and FIG. 4 (i.e., 500'), further expanding or enhancing the viewing angle in which substantially unobstructed viewing may be observed from the interior space.

Figure 7:
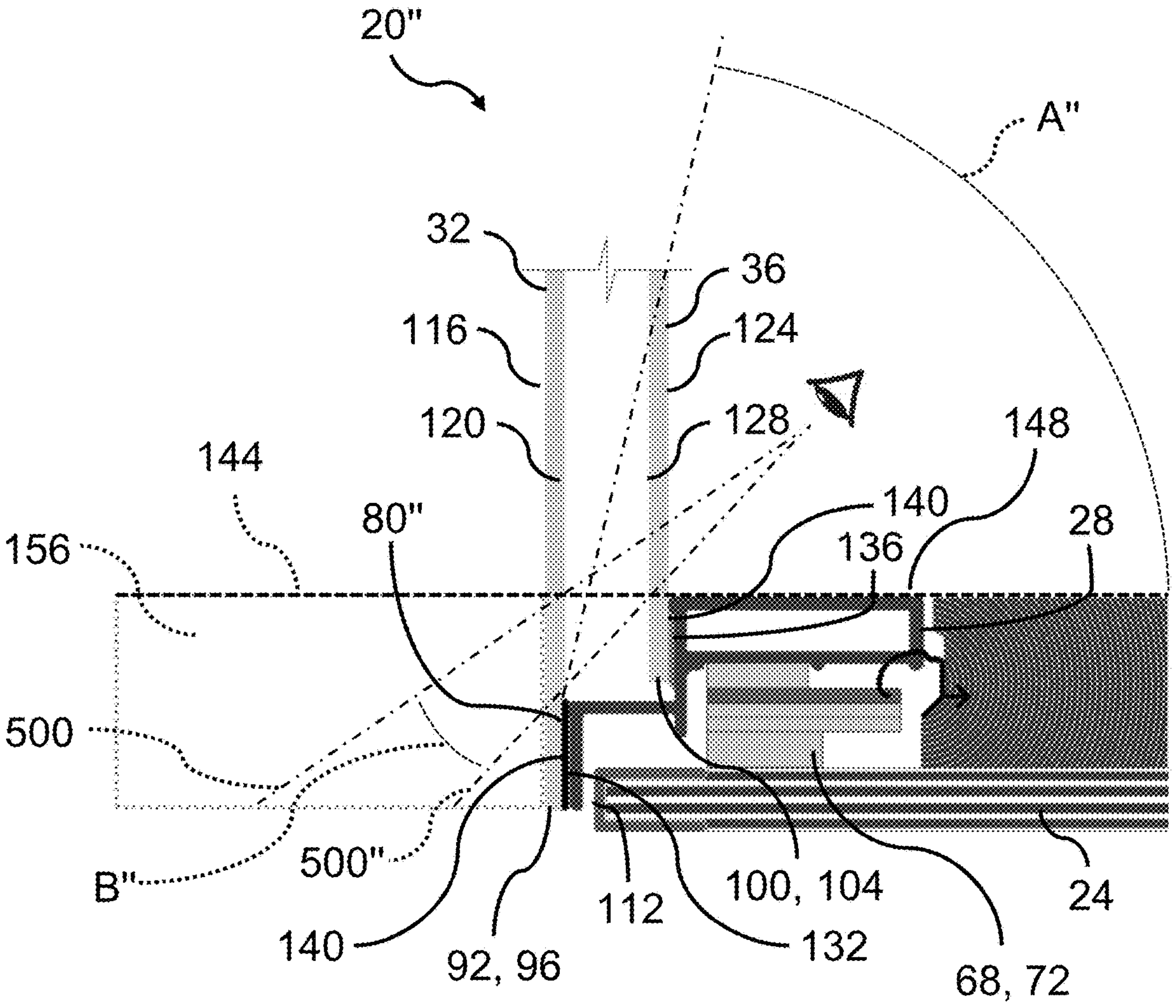
FIG. 7 shows the expanded view fenestration unit of FIG. 2, according to some examples.

FIG. 7 shows still another example in which the second pane 36 is secured to the sash 28 and/or the frame 24 (e.g., via adhesive 140) without a spacer (e.g., 108, 108', or 108") or a cover (e.g., 110) positioned between the first pane 32 and the second pane 36 to obtain vision line 500". In the example of FIG. 7, the lack of a spacer provides a resultant vision line 500" is more away from the center of the frame 40 (see FIG. 2) than the vision line 500 of FIG. 3 (i.e., differs by angle B"), effectively expanding or enhancing the viewing angle in which substantially unobstructed viewing may be observed from the interior space.

Figure 8:
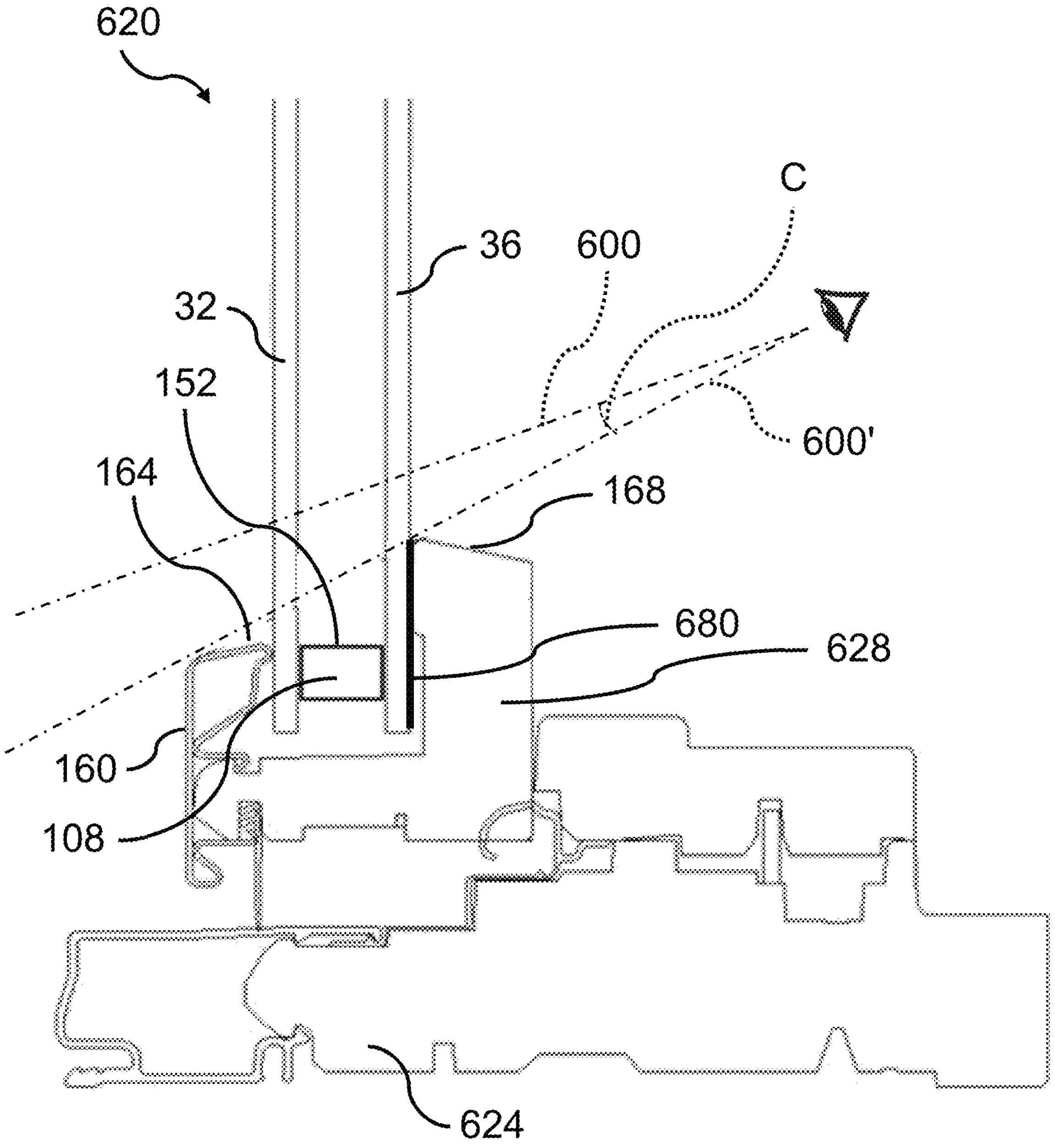
FIG. 8 shows another expanded view fenestration unit, according to some examples.

FIG. 8 shows another example of an expanded view fenestration unit 620 in which a cladding 160 is coupled to the first or exterior pane 32. A top 164 of the cladding 160 may be substantially level (e.g., offset by less than 1 cm, or 5 mm, or less) with the center-facing surface 152 of an optional spacer 108 positioned between the exterior pane 32 and the interior pane 36. The cladding 160 may be attached to or formed as part of a sash 628 of the fenestration unit 620. As depicted, the top 164 of the cladding 160 is positioned closer to the frame 624 than a top 168 of the sash 628 such that a vision line 600' is obtained. Vision line 600' is farther away (e.g., differs by angle C) from a center of the frame (similar to 40 of FIG. 2 for frame 24) than a vision line 600 obtainable if the top 164 of the cladding 160 were at substantially the same level as the top 168 of the sash 628. Such an arrangement of cladding 160 effectively expands or enhances the viewing angle in which substantially unobstructed viewing may be observed from the interior space. A peripheral shield 680 may be disposed at or near the interface of the interior pane 36 and the sash 628 such that the inner portions of the sash 628 are shielded from observation (e.g., by an external view of the fenestration unit 620).

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the described features. Accordingly, the scope of the present disclosure is intended to embrace all such alternatives, modifications, and variations as fall within the scope of the claims, together with all equivalents thereof.

What is claimed is:

1. A fenestration unit configured to be installed in a structure having an interior side and an exterior side, the fenestration unit comprising:

a frame having a center, a lower portion, an interior-facing side, and an exterior-facing side;

a sash coupled to the frame, the sash including a top surface and a lower surface;

an interior pane;

an exterior pane, the interior and exterior panes coupled to the sash wherein the lower surface of the sash extends from the interior-facing side of the frame to the exterior-facing side of the frame;

a peripheral shield coupled to a portion of the interior pane;

a spacer positioned between the exterior pane and the interior pane, the spacer having a lower portion with a center-facing surface; and a cladding coupled to the exterior pane, the cladding having an upper surface that is located on substantially the same level as or more outward than the center-facing surface of the spacer, wherein a distance between the upper surface of the cladding and the lower portion of the frame is less than a distance between the top surface of the sash and the lower portion of the frame, wherein the interior pane includes a top end and a bottom end, wherein the peripheral shield substantially extends from the top surface of the sash to the bottom end of the interior pane.

2. The fenestration unit of claim 1, wherein the cladding forms part of the sash of the fenestration unit.

3. The fenestration unit of claim 1, wherein a vision line is defined along the upper surface of the cladding and the top surface of the sash, and further wherein the vision line is farther away from a center of the frame than a theoretical vision line that would be defined if the upper surface of the cladding were at substantially the same level as the top surface of the sash, wherein such that an arrangement of the cladding relative to the sash effectively expands a viewing angle for substantially unobstructed viewing that may be observed from an interior space of the fenestration unit relative to a theoretical viewing angle that would be achieved with the theoretical vision line.

4. The fenestration unit of claim 1, wherein the peripheral shield is disposed proximate an interface between the interior pane and the sash.

5. The fenestration unit of claim 1, wherein the sash defines an inner surface configured to face toward the interior pane, and the inner surface of the sash is shielded from observation by the peripheral shield.

6. The fenestration unit of claim 1, wherein the sash comprises pultruded fiberglass.

7. The fenestration unit of claim 1, wherein the interior pane has an inner perimeter including a first interior pane edge, wherein the peripheral shield has an inner perimeter including a first inner edge, and wherein the first inner edge of the peripheral shield is closer to a center of the fenestration unit than the first interior pane edge.

8. The fenestration of claim 1, wherein the peripheral shield is formed of a ceramic enamel frit that is configured to substantially match at least one aesthetic features of the exterior-facing side of the frame.

9. The fenestration unit of claim 1, wherein the peripheral shield includes an outer perimeter, an inner perimeter, and a width defined between the inner perimeter and the outer perimeter, wherein a dimension of the width is approximately two inches.

10. A fenestration unit comprising:

a frame having an interior-facing side and an exterior-facing side;

a sash coupled to the frame, the sash including a top surface and a lower surface having a portion extending from the interior-facing side to the exterior-facing side;

an exterior pane coupled to the sash;

an interior pane coupled to the sash;

a peripheral shield coupled to a portion of the interior pane;

a spacer positioned between the exterior pane and the interior pane, the spacer having an upward-facing surface; and a cladding coupled to the exterior pane, the cladding having an upper surface that is positioned at, or more outwardly than the upward-facing surface of the spacer, wherein a vision line is defined along the upper surface of the cladding and the top surface of the sash, wherein the upper surface of the cladding is at a lower position than the top surface of the sash, wherein the interior pane includes a top end and a bottom end, wherein the peripheral shield substantially extends from the top surface of the sash to the bottom end of the interior pane.

11. The fenestration unit of claim 10, wherein the peripheral shield is disposed on the interior pane such that inner portions of the sash are shielded from observation by the peripheral shield when viewed at a direct angle from the exterior.

12. The fenestration unit of claim 10, wherein the cladding forms part of the sash of the fenestration unit.

13. The fenestration unit of claim 10, wherein a distance between the upper surface of the cladding and a lower portion of the frame is less than a distance between a top surface of the sash and the lower portion of the frame.

14. The fenestration unit of claim 10, wherein the vision line is farther away from a center of the frame than a theoretical vision line that would be defined if the upper surface of the cladding were at substantially the same level as the top surface of the sash, wherein such that an arrangement of the cladding relative to the sash effectively expands a viewing angle for substantially unobstructed viewing that may be observed from an interior space of the fenestration unit relative to a theoretical viewing angle that would be achieved with the theoretical vision line.

15. The fenestration unit of claim 10, wherein the peripheral shield is disposed proximate an interface between the interior pane and the sash.

16. The fenestration unit of claim 10, wherein the sash defines an inner surface configured to face toward the interior pane, and the inner surface of the sash is shielded from observation by the peripheral shield.

17. A fenestration unit comprising:

a frame having a perimeter defining a center, an interior-facing side, and an exterior-facing side;

a sash coupled to the frame, the sash including a top surface and a lower surface having a portion extending from the interior-facing side to the exterior-facing side;

an exterior pane coupled to the sash;

an interior pane coupled to the sash;

a peripheral shield coupled to a portion of the interior pane;

a spacer positioned between the exterior pane and the interior pane, the spacer having a lower portion and an upward-facing surface; and a member positioned exterior to the exterior pane and coupled to the exterior pane, the member having an upper surface that is positioned at, or more outwardly from the center of the frame than the upward-facing surface of the spacer, wherein a distance between the upper surface of the member and a lower perimeter of the frame is less than a distance between the top surface of the sash and a lower perimeter of the frame, wherein the interior pane includes a top end and a bottom end, wherein the peripheral shield substantially extends from the top surface of the sash to the bottom end of the interior pane.

18. The fenestration unit of claim 17, wherein the peripheral shield is disposed on the interior pane such that inner portions of the sash are shielded from observation by the peripheral shield when viewed at a direct angle from the exterior.

19. The fenestration unit of claim 17, wherein the member forms part of the sash of the fenestration unit.

20. The fenestration unit of claim 17, wherein a vision line is defined along the upper surface of the member and a top surface of the sash, and further wherein the vision line is farther away from the center of the frame than a theoretical vision line that would be defined if the upper surface of the member were at substantially the same level as the top surface of the sash, wherein such that an arrangement of the member relative to the sash effectively expands a viewing angle for substantially unobstructed viewing that may be observed from an interior space of the fenestration unit relative to a theoretical viewing angle that would be achieved with the theoretical vision line.

* * * * *